(12) United States Patent
Park et al.

(10) Patent No.: US 12,060,841 B2
(45) Date of Patent: Aug. 13, 2024

(54) HYBRID ELECTRIC VEHICLE AND ENGINE CONTROL METHOD THEREFOR

(71) Applicants: Hyundai Motor Company, Seoul (KR); Kia Corporation, Seoul (KR)

(72) Inventors: Se Jun Park, Gyeonggi-do (KR); Jeong Hyeon Kim, Gyeonggi-do (KR); Jong Hyuck Kim, Gyeonggi-do (KR); Kyu Hyun Sim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 66 days.

(21) Appl. No.: 17/885,372

(22) Filed: Aug. 10, 2022

(65) Prior Publication Data

US 2023/0046626 A1 Feb. 16, 2023

(30) Foreign Application Priority Data

Aug. 11, 2021 (KR) .................. 10-2021-0106009

(51) Int. Cl.
| | | |
|---|---|---|
| *F02D 17/02* | (2006.01) | |
| *B60W 10/06* | (2006.01) | |
| *B60W 20/15* | (2016.01) | |
| *B60W 30/194* | (2012.01) | |
| *F02D 41/00* | (2006.01) | |

(52) U.S. Cl.
CPC ............ *F02D 17/02* (2013.01); *B60W 10/06* (2013.01); *B60W 20/15* (2016.01); *B60W 30/194* (2013.01); *F02D 41/0087* (2013.01); *B60W 2510/0676* (2013.01); *B60W 2710/065* (2013.01); *B60W 2710/0666* (2013.01)

(58) Field of Classification Search
CPC .... F02D 17/02; F02D 17/0087; B60W 10/06; B60W 2510/0676; B60W 2510/0666; B60H 1/004; B60H 1/00964
See application file for complete search history.

(56) References Cited

U.S. PATENT DOCUMENTS

| | | | |
|---|---|---|---|
| 5,732,676 A * | 3/1998 | Weisman ............ | F02D 41/0007 123/436 |
| 11,105,277 B1 * | 8/2021 | Dudar .................. | F02D 41/062 |
| 2003/0101961 A1 * | 6/2003 | Foster .................. | F01N 3/0885 123/198 F |
| 2004/0182097 A1 * | 9/2004 | La Falce ................ | B60H 1/004 62/226 |
| 2016/0137030 A1 * | 5/2016 | Leone .................. | F02D 41/0082 237/5 |

(Continued)

*Primary Examiner* — George C Jin
(74) *Attorney, Agent, or Firm* — Fox Rothschild LLP (57) ABSTRACT

Disclosed are a hybrid electric vehicle capable of controlling starting of an engine in order to more efficiently realize heating and an engine control method therefor. The method of controlling an engine of a hybrid electric vehicle of the disclosure includes determining whether the engine is in a warmed-up state when a fully automatic temperature control system makes a heating request, making an engine startup request for heating to an engine management system configured to control the engine when the engine is in the warmed-up state, and selectively requesting the engine management system to perform cylinder deactivation (CDA) control on at least some of a plurality of cylinders of the engine depending on whether the engine is in an idling state.

13 Claims, 4 Drawing Sheets

(56) References Cited

U.S. PATENT DOCUMENTS

| | | | |
|---|---|---|---|
| 2016/0215681 A1* | 7/2016 | Brinkmann | F01P 7/165 |
| 2017/0306893 A1* | 10/2017 | Leone | F02D 41/064 |
| 2020/0361286 A1* | 11/2020 | Schlingmann | B60H 1/03 |
| 2021/0388787 A1* | 12/2021 | Lee | F02D 41/068 |
| 2023/0067392 A1* | 3/2023 | Kim | B60W 10/06 |

* cited by examiner

HYBRID ELECTRIC VEHICLE AND ENGINE CONTROL METHOD THEREFOR

CROSS-REFERENCE TO RELATED APPLICATIONS

This application claims under 35 U.S.C. § 119(a) the benefit of Korean Patent Application No. 10-2021-0106009, filed on Aug. 11, 2021, which is hereby incorporated by reference as if fully set forth herein.

BACKGROUND

Technical Field

The present disclosure relates to a hybrid electric vehicle capable of controlling starting of an engine in order to more efficiently realize heating and an engine control method therefor.

Description of the Related Art

In general, a hybrid electric vehicle (HEV) is a vehicle that uses two types of power sources in a combined manner, and the two types of power sources are generally an engine and an electric motor. Compared to a vehicle that is driven using only an internal combustion engine, a hybrid electric vehicle has excellent fuel efficiency and power performance, and is also advantageous in that emissions therefrom are low, and therefore has actively been developed in recent years.

In a hybrid electric vehicle, when indoor heating is required, heat of a coolant of an engine is generally used. However, heat of the coolant of the engine can be used only when the engine is driven to some extent. Alternatively, an electronic heater (for example, a positive temperature coefficient (PTC) heater) may be used. However, use of the electronic heater greatly consumes the power of a battery. When indoor heating is required in the situation in which the hybrid electric vehicle is capable of being driven using only the electric motor or is stopped, the engine needs to be started up in order to idle. Particularly, because the torque of the engine is generally low during the idling operation, brake specific fuel consumption (BSFC) is far from an optimal operation line (OOL), which causes unnecessary starting of the engine and resultant degradation of fuel efficiency.

SUMMARY

Accordingly, the present disclosure is directed to a hybrid electric vehicle and an engine control method therefor that substantially obviate one or more problems due to limitations and disadvantages of the related art.

Embodiments of the present disclosure are directed to a hybrid electric vehicle capable of controlling starting of an engine in order to more efficiently realize heating and an engine control method therefor.

However, objects to be accomplished by the present disclosure are not limited to the above-mentioned objects, and other objects not mentioned herein will be clearly understood by those skilled in the art from the following description.

Embodiments of the present disclosure are directed to a method of controlling an engine of a hybrid electric vehicle comprising determining whether the engine is in a warmed-up state when a fully automatic temperature control system makes a heating request, making an engine startup request for heating to an engine management system configured to control the engine when the engine is in the warmed-up state, and selectively requesting the engine management system to perform cylinder deactivation (CDA) control on at least some of a plurality of cylinders of the engine depending on whether the engine is in an idling state.

For example, the warmed-up state may be a state in which a catalyst is completely warmed up and the temperature of a coolant is equal to or higher than a predetermined initial warm-up temperature.

For example, the selectively requesting the engine management system to perform CDA control may include requesting the engine management system to perform CDA control when the engine is in the idling state.

For example, the selectively requesting the engine management system to perform CDA control may include not requesting the engine management system to perform CDA control when the engine is in a part load control state or a full load control state enabling the power of the engine to be used to drive the vehicle.

For example, when the temperature of the coolant is equal to or lower than a first temperature, the fully automatic temperature control system may make the heating request, and when the temperature of the coolant is equal to or higher than a second temperature higher than the first temperature, the fully automatic temperature control system may make a heating termination request.

For example, the method may further include turning off the engine when the fully automatic temperature control system makes the heating termination request and the engine is not in the part load control state or the full load control state enabling the power of the engine to be used to drive the vehicle.

In addition, a hybrid electric vehicle according to an embodiment of the present disclosure includes an engine management system configured to control an engine, a fully automatic temperature control system configured to make a heating request or a heating termination request depending on the temperature of a coolant, and a hybrid control unit configured to determine whether the engine is in a warmed-up state when receiving the heating request from the fully automatic temperature control system, to make an engine startup request for heating to the engine management system when the engine is in the warmed-up state, and to selectively request the engine management system to perform cylinder deactivation (CDA) control on at least some of a plurality of cylinders of the engine depending on whether the engine is in an idling state.

For example, the warmed-up state may be a state in which a catalyst is completely warmed up and the temperature of the coolant is equal to or higher than a predetermined initial warm-up temperature.

For example, when the engine is in the idling state, the hybrid control unit may request the engine management system to perform CDA control.

For example, when the engine is in a part load control state or a full load control state enabling the power of the engine to be used to drive the vehicle, the hybrid control unit may not request the engine management system to perform CDA control.

For example, when the temperature of the coolant is equal to or lower than a first temperature, the fully automatic temperature control system may make the heating request, and when the temperature of the coolant is equal to or higher than a second temperature higher than the first temperature, the fully automatic temperature control system may make the heating termination request.

For example, when the fully automatic temperature control system makes the heating termination request and the engine is not in the part load control state or the full load control state enabling the power of the engine to be used to drive the vehicle, the hybrid control unit may perform control such that the engine is turned off.

BRIEF DESCRIPTION OF THE DRAWINGS

The accompanying drawings, which are included to provide a further understanding of the disclosure and are incorporated in and constitute a part of this application, illustrate embodiment(s) of the invention and together with the description serve to explain the embodiments. In the drawings.

DETAILED DESCRIPTION OF THE INVENTION

Hereinafter, embodiments of the present invention will be described in detail with reference to the accompanying drawings so that those skilled in the art may easily carry out the embodiments. The present invention may, however, be embodied in many different forms, and should not be construed as being limited to the embodiments set forth herein. In the drawings, parts irrelevant to the description will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components.

As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The term "unit" or "control unit" forming part of the name of the hybrid control unit (HCU) is merely a term that is widely used in naming a controller for controlling a specific function of a vehicle, and should not be construed as meaning a generic function unit. For example, in order to control the function peculiar thereto, each control unit may include a communication device, which communicates with other control units or sensors, a memory, which stores therein an operating system, logic commands, and input/output information, and one or more processors, which perform determinations, calculations, and decisions necessary for control of the function peculiar thereto.

According to embodiments of the present disclosure, when there is an engine startup request for heating, if engine idling control is possible in the state in which the engine is already warmed up, cylinder deactivation (CDA) control is performed on at least some of a plurality of cylinders of the engine in order to improve fuel efficiency.

Figure 1:
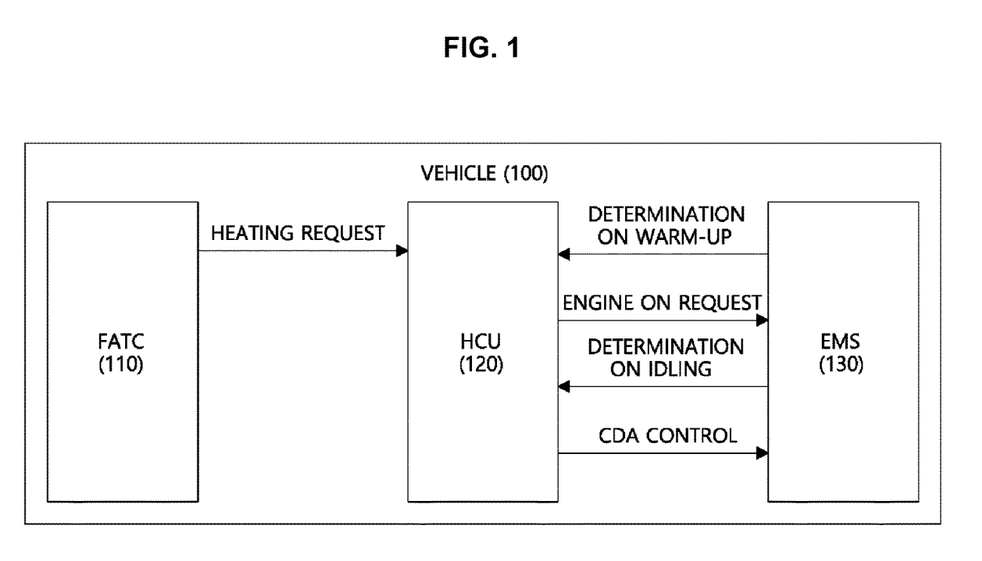
FIG. 1 illustrates an example of the configuration of a hybrid electric vehicle according to an embodiment of the present disclosure.

FIG. 1 illustrates an example of the configuration of a hybrid electric vehicle according to an embodiment of the present disclosure.

Referring to FIG. 1, a hybrid electric vehicle 100 according to an embodiment may include a full automatic temperature control (FATC) system 110, a hybrid control unit (HCU) 120, and an engine management system (EMS) 130.

FIG. 1 illustrates only components related to embodiments of the present disclosure. In practice, the hybrid electric vehicle 100 may include a greater number of components, such as an engine that is controlled by the EMS 130.

First, when the temperature of a coolant needs to be raised in order to satisfy a set indoor temperature, the FATC system 110 may make an engine startup request for heating (i.e. a heating request) to the HCU 120.

The HCU 120 is a higher-level control unit that controls the overall operation of the powertrain of the hybrid electric vehicle, and the EMS 130 and a motor control unit (not shown) are provided as lower-level control units of the HCU 120. When receiving the heating request from the FATC system 110, the HCU 120 determines whether the engine is warmed up through the EMS 130. Upon determining that the engine is in a warmed-up state, the HCU 120 makes an engine startup (on) request for heating. In addition, upon determining that the engine is in an idling state, the HCU 120 may make a CDA control request.

Here, the warmed-up state of the engine may mean the state in which heating of a catalyst for purification of emission is completed and initial warming-up of the coolant is also completed. Although the disclosure is not limited thereto, it takes about 10 seconds to heat the catalyst, and it takes a longer time to initially warm up the coolant. In general, the EMS 130 controls the engine to rotate at an RPM higher than an idling RPM until the engine is warmed up.

In addition, the idling state of the engine is the state in which the engine speed is controlled to be maintained at a predetermined idling RPM (e.g. 600 to 700 RPM). In the present disclosure, the idling state of the engine is conceptually distinguished from a part load control state or a full load control state, in which the engine generates driving force to drive wheels. That is, the idling state of the engine may not be a state in which the engine torque is used to drive the vehicle.

Next, the effect of CDA control will be described with reference to FIG. 2.

Figure 2:
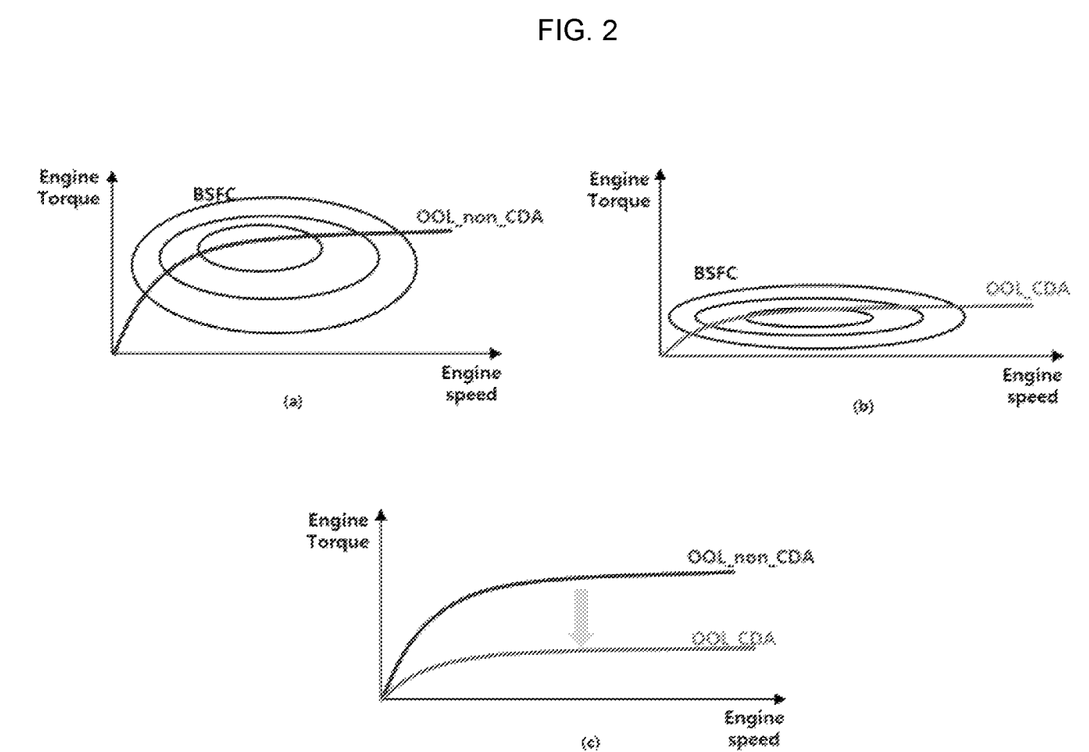
FIG. 2 is a diagram for explaining the effect of cylinder deactivation (CDA) control according to an exemplary embodiment of the present disclosure.

FIG. 2 is a diagram for explaining the effect of CDA control according to an embodiment of the present disclosure.

In each of the graphs illustrated in FIGS. 2(a), 2(b), and 2(c), the vertical axis represents the engine torque and the horizontal axis represents the engine speed (RPM). In addition, in FIGS. 2(a) and 2(b), each ellipse is a closed curve formed by connecting operation points having the same BSFC. Fuel efficiency is gradually improved from the outermost ellipse to the innermost ellipse. In addition, "OOL" is a line formed by connecting optimal efficiency operation points.

FIG. 2(a) is a BSFC diagram in a normal control state, rather than a CDA control state, and FIG. 2(b) is a BSFC diagram in a CDA control state. Comparing FIGS. 2(a) and 2(b), it can be seen that, when CDA control is performed, operation points having relatively high efficiency are generally shifted to a low torque range. In particular, referring to FIG. 2(c), which illustrates a graph indicating the OOL (OOL non CDA) shown in FIG. 2(a) and the OOL (OOL CDA) shown in FIG. 2(b), it can be seen that the torque range of the OOL in the CDA control state is lower than that of the OOL in the normal control state at the same RPM. Accordingly, when CDA control is performed in the idling state, in which the output torque is low, the OOL is also shifted to a low torque range, thus enabling the engine to start with improved fuel efficiency compared to when CDA control is not performed.

Figure 3:
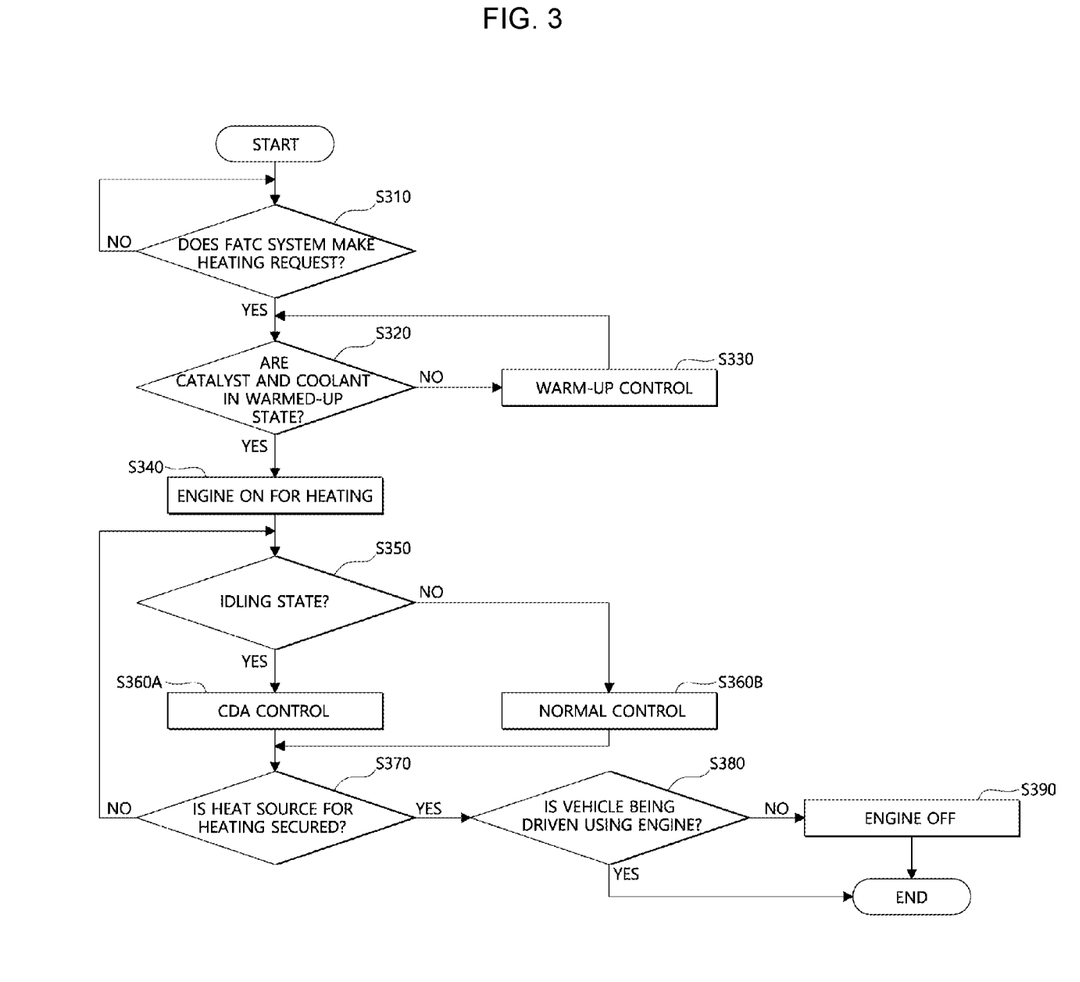
FIG. 3 is a flowchart showing an example of an engine control process according to an embodiment of the present disclosure.

FIG. 3 is a flowchart showing an example of an engine control process according to an embodiment of the present disclosure.

Referring to FIG. 3, when receiving an engine startup request for heating, i.e. a heating request, from the FATC system 110 (Yes in S310), the HCU 120 determines whether the catalyst and the coolant of the engine are in a warmed-up state through the EMS 130 (S320).

If not in the warmed-up state, the HCU 120 may make a request for engine warm-up control to the EMS 130, and the EMS 130 may control the engine so that the catalyst and the coolant are warmed up (S330).

When the engine is in the warmed-up state (Yes in S320), the HCU 120 makes an engine startup request for heating to the EMS 130 (S340).

The HCU 120 checks the state of the engine through the EMS 130. When the engine is in an idling state (Yes in S350), the HCU 120 makes a request for CDA control to the EMS 130. Accordingly, the EMS 130 may perform CDA control on at least some of the plurality of cylinders of the engine (S360A). When the engine is not in the idling state (for example, when the engine is in a part load control state or a full load control state) (No in S350), the HCU 120 does not make a request for CDA control, and accordingly, the engine is driven in response to normal control, for example, is started in order to satisfy required torque (S360B).

The reason why a request for CDA control is not made when the engine is not in the idling state will now be described. The non-idling state of the engine is the state in which the engine is being driven in a part load control mode or a full load control mode in order to satisfy required torque. If CDA control is performed in this state, it is difficult for the engine to satisfy the required torque due to deactivation of some cylinders of the engine. In addition, since the engine is outputting driving force to be transmitted to the wheels, this operation of the engine is essential operation, and the engine is being driven at an RPM higher than an idling RPM, whereby the temperature of the coolant is rapidly raised, and accordingly, it is not necessary to perform CDA control.

Selective performance of CDA control depending on whether the engine is in the idling state (S350, S360A, and S360B) may be carried out until the temperature of the coolant is raised to a temperature required for heating, that is, until a heat source for heating is secured (No in S370).

When the heat source for heating is secured (Yes in S370), the FATC system 110 makes a heating termination request, and accordingly, the HCU 120 determines whether the vehicle is being driven using the power of the engine (S380). When the vehicle is being driven using the power of the engine (Yes in S380), the HCU 120 terminates engine control for heating, and when the vehicle is not being driven using the power of the engine (No in S380), the HCU 120 makes an engine off request to the EMS 130 (S390). Here, terminating engine control for heating is terminating engine control for the purpose of raising the temperature of the coolant. Even though engine control for heating is terminated, engine control for the purpose of driving the vehicle may be continuously performed as needed.

Meanwhile, when the engine is turned off after the heat source for heating is secured, the temperature of the coolant may drop, and accordingly, the FATC system 110 may make a heating request again. In this case, the HCU 120 may perform the process shown in FIG. 3 again.

The engine control process described with reference to FIG. 3 will be described below in more detail with reference to FIG. 4.

Figure 4:
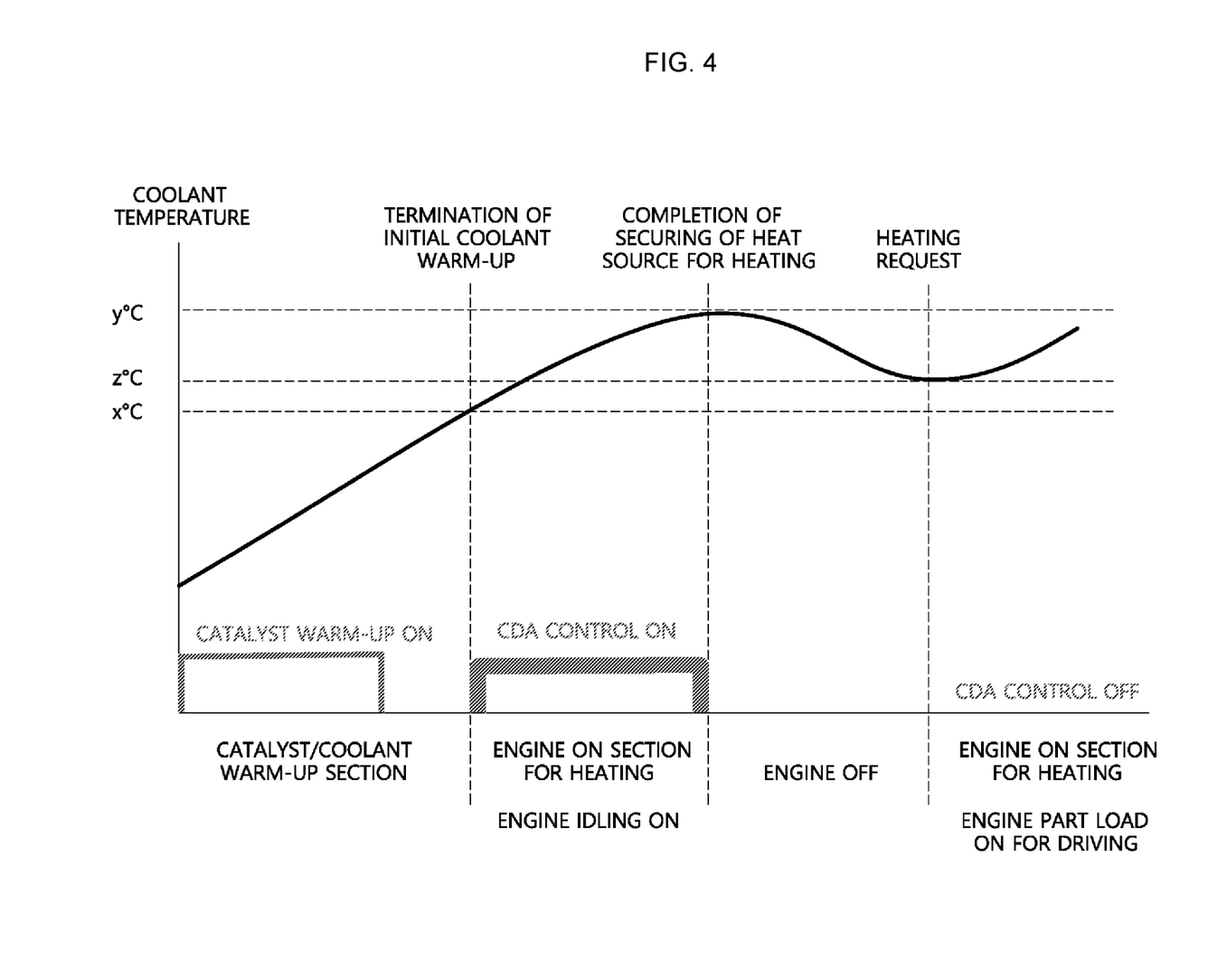
FIG. 4 illustrates an example of the manner in which engine control is performed according to an embodiment of the present disclosure.

FIG. 4 illustrates an example of the manner in which engine control is performed according to an embodiment of the present disclosure.

In FIG. 4, it is assumed that, when the temperature of the coolant becomes equal to or lower than a heating request temperature ($z°$ C.), the FATC system 110 makes a heating request to the HCU 120 and that, when the temperature of the coolant becomes equal to or higher than a target heating temperature (° C.), the FATC system 110 makes a heating termination request. In addition, it is assumed that, when the temperature of the coolant reaches an initial warm-up temperature (x° C.), the EMS 130 determines that the coolant has been completely warmed up. The initial warm-up temperature (x° C.) may be a predetermined temperature, and the heating request temperature (z° C.) and the target heating temperature (y° C.) may be predetermined, or may vary depending on the target indoor temperature. It is assumed that the temperatures satisfy the relationships of y>z>x. However, this is merely exemplary, and the disclosure is not limited thereto. In addition, in FIG. 4, it is assumed that the engine starts in a cold state.

Referring to FIG. 4, in order to satisfy the target indoor temperature set through manipulation of an air-conditioner by the driver or the predetermined target indoor temperature, the FATC system 110 checks the temperature of the coolant. Because the engine is in a cold state, the temperature of the coolant is lower than the heating request temperature (z° C.), and accordingly, the FATC system 110 makes a heating request to the HCU.

Accordingly, the HCU 120 may check the state of the engine through the EMS 130, and may make a warm-up control request to the EMS 130 because the engine is not in a warmed-up state. The EMS 130 may perform warm-up control to warm up the engine.

When the catalyst is completely warmed up and the temperature of the coolant reaches the initial warm-up temperature (x° C.), the HCU 120 determines that the engine is in the warmed-up state, and makes an engine startup request for heating to the EMS 130. As shown in FIG. 4, in the state in which the engine has already been started so as to be warmed up, additional starting of the engine is not necessary. However, in the state in which the engine has been turned off after warming up, the EMS 130 may start the engine in response to the engine startup request for heating.

In this case, if the power of the engine is not used to drive the vehicle, this means that the engine is being controlled in the idling state. Accordingly, the HCU 120 may make a CDA control request to the EMS 130. As a result, the OOL is shifted to a low torque range, and thus fuel efficiency is improved during starting of the engine for heating.

When the temperature of the coolant reaches the target heating temperature (y° C.) and thus the heat source for heating is secured, the FATC system 110 makes a heating termination request to the HCU 120. Accordingly, when the power of the engine is not used to drive the vehicle, the HCU 120 makes an engine off request to the EMS 130.

Thereafter, when the temperature of the coolant drops and reaches the heating request temperature (z° C.), the FATC system 110 makes a heating request to the HCU 120 again. In this case, because the temperature of the coolant is higher than the initial warm-up temperature (x° C.), warm-up control is unnecessary. Accordingly, the HCU 120 immediately makes an engine startup request for heating to the EMS 130. However, when the engine startup request for heating is made, if the engine enters a part load control mode for driving the vehicle, the HCU 120 does not make a CDA control request.

Embodiments of the present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

A hybrid electric vehicle related to at least one embodiment of the present disclosure configured as described above may control starting of an engine in order to more efficiently realize heating.

Particularly, when a predetermined condition is satisfied during starting of the engine for heating, CDA control is performed on some of the cylinders of the engine, thereby improving fuel efficiency in a low torque range, thus improving the overall fuel efficiency of the vehicle.

However, the effects achievable through embodiments of the present disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the embodiments set forth herein. Accordingly, the above detailed description is not intended to be construed to limit the invention in all aspects and to be considered by way of example. The scope of the invention should be determined by reasonable interpretation of the appended claims and all equivalent modifications made without departing from the invention should be included in the following claims.

What is claimed is:

1. A method of controlling an engine of a hybrid electric vehicle, the method comprising:
    determining whether the engine is in a warmed-up state when a fully automatic temperature control system makes a heating request;
    making an engine startup request for heating to an engine management system configured to control the engine when the engine is in the warmed-up state; and
    selectively requesting the engine management system to perform cylinder deactivation (CDA) control on at least some of a plurality of cylinders of the engine depending on whether the engine is in an idling state;
    wherein the selective performance of CDA control depending on whether the engine is in the idling state is carried out until a temperature of a coolant of the engine is raised to a temperature required to satisfy a set indoor temperature of the vehicle.

2. The method of claim 1, wherein the warmed-up state is a state in which a catalyst is completely warmed up and the temperature of the coolant is equal to or higher than a predetermined initial warm-up temperature.

3. The method of claim 1, wherein the selectively requesting the engine management system to perform CDA control comprises requesting the engine management system to perform CDA control when the engine is in the idling state.

4. The method of claim 1, wherein the selectively requesting the engine management system to perform CDA control comprises not requesting the engine management system to perform CDA control when the engine is in a part load control state or a full load control state enabling power of the engine to be used to drive the vehicle.

5. The method of claim 1, wherein, when the temperature of the coolant is equal to or lower than a first temperature, the fully automatic temperature control system makes the heating request, and
    wherein, when the temperature of the coolant is equal to or higher than a second temperature higher than the first temperature, the fully automatic temperature control system makes a heating termination request.

6. The method of claim 1, further comprising:
turning off the engine when the fully automatic temperature control system makes a heating termination request and the engine is not in a part load control state or a full load control state enabling power of the engine to be used to drive the vehicle.

7. A non-transitory computer-readable recording medium storing a program configured to execute the method of controlling an engine of a hybrid electric vehicle of claim 1.

8. A hybrid electric vehicle comprising:
an engine management system configured to control an engine;
a fully automatic temperature control system configured to make a heating request or a heating termination request depending on a temperature of a coolant; and
a hybrid control unit configured to:
determine whether the engine is in a warmed-up state when receiving the heating request from the fully automatic temperature control system,
make an engine startup request for heating to the engine management system when the engine is in the warmed-up state, and
selectively request the engine management system to perform cylinder deactivation (CDA) control on at least some of a plurality of cylinders of the engine depending on whether the engine is in an idling state;
wherein the hybrid control unit configured to selectively request the engine management system to perform CDA control depending on whether the engine is in the idling state is carried out until the temperature of the coolant is raised to a temperature required to satisfy a set indoor temperature of the vehicle.

9. The hybrid electric vehicle of claim 8, wherein the warmed-up state is a state in which a catalyst is completely warmed up and the temperature of the coolant is equal to or higher than a predetermined initial warm-up temperature.

10. The hybrid electric vehicle of claim 8, wherein, when the engine is in the idling state, the hybrid control unit requests the engine management system to perform CDA control.

11. The hybrid electric vehicle of claim 8, wherein, when the engine is in a part load control state or a full load control state enabling power of the engine to be used to drive the vehicle, the hybrid control unit does not request the engine management system to perform CDA control.

12. The hybrid electric vehicle of claim 8, wherein, when the temperature of the coolant is equal to or lower than a first temperature, the fully automatic temperature control system makes the heating request, and
wherein, when the temperature of the coolant is equal to or higher than a second temperature higher than the first temperature, the fully automatic temperature control system makes the heating termination request.

13. The hybrid electric vehicle of claim 8, wherein, when the fully automatic temperature control system makes the heating termination request and the engine is not in a part load control state or a full load control state enabling power of the engine to be used to drive the vehicle, the hybrid control unit performs control such that the engine is turned off.

\* \* \* \* \*